(12) United States Patent
Direen

(10) Patent No.: US 7,089,382 B2
(45) Date of Patent: Aug. 8, 2006

(54) METHOD OF OPERATING A HIERARCHICAL DATA DOCUMENT SYSTEM HAVING A DUPLICATE TREE STRUCTURE

(75) Inventor: Harry George Direen, Colorado Springs, CO (US)

(73) Assignee: Xpriori, LLC

( * ) Notice: Subject to any disclaimer, the term of this patent is extended or adjusted under 35 U.S.C. 154(b) by 559 days.

(21) Appl. No.: 09/962,952

(22) Filed: Sep. 25, 2001

(65) Prior Publication Data

US 2002/0046205 A1 Apr. 18, 2002

Related U.S. Application Data

(60) Provisional application No. 60/240,574, filed on Oct. 13, 2000.

(51) Int. Cl.
*G06F 12/06* (2006.01)

(52) U.S. Cl. ............................... 711/161; 711/162

(58) Field of Classification Search ................ 711/161, 711/162, 205, 206, 208
See application file for complete search history.

(56) References Cited

U.S. PATENT DOCUMENTS

| 4,758,951 | A | * | 7/1988 | Sznyter, III ................. 711/206 |
| 5,410,667 | A | * | 4/1995 | Belsan et al. ................ 711/114 |
| 6,112,286 | A | * | 8/2000 | Schimmel et al. ........... 711/208 |
| 6,457,109 | B1 | * | 9/2002 | Mililo et al. ................ 711/162 |
| 6,505,268 | B1 | * | 1/2003 | Schultz et al. ................ 711/4 |

* cited by examiner

*Primary Examiner*—T Nguyen
(74) *Attorney, Agent, or Firm*—Dale B. Halling

(57) ABSTRACT

A hierarchical structured data document system having a duplicated tree structure includes a map store (350, 352). A map index (354) has a map pointer pointing to a location in the map store in one of the map index's locations. A duplicate array (364) contains a second map pointer. The map index (354) has an array pointer that points to the duplicate array. The duplicate array stores map pointers pointing to duplicates of tags or data stored in the map store.

27 Claims, 13 Drawing Sheets

*10*

```
18—<CATALOG>  ⸺12         ⸺22  ⸺16  ⸺24
20—  <CD>
26—    <TITLE>Empire Burlesque</TITLE>
       <ARTIST>Bob Dylan</ARTIST>
       <COUNTRY>USA</COUNTRY>
       <COMPANY>Columbia</COMPANY>
       <PRICE>10.90</PRICE>
       <YEAR>1985</YEAR>
     </CD>
     <CD>
       <TITLE>Hide your heart</TITLE>
       <ARTIST>BonnieTylor</ARTIST>
       <COUNTRY>UK</COUNTRY>
       <COMPANY>CBS Records</COMPANY>
       <PRICE>9.90</PRICE>
       <YEAR>1988</YEAR>
     </CD>
     <CD>
       <TITLE>Greatest Hits</TITLE>
       <ARTIST>Dolly Parton</ARTIST>
       <COUNTRY>USA</COUNTRY>
       <COMPANY>RCA</COMPANY>
       <PRICE>9.90</PRICE>
       <YEAR>1982</YEAR>
     </CD>
     <CD>
       <TITLE>Still got the blues</TITLE>
       <ARTIST>Gary More</ARTIST>
       <COUNTRY>UK</COUNTRY>
       <COMPANY>Virgin records</COMPANY>
       <PRICE>10.20</PRICE>
       <YEAR>1990</YEAR>
     </CD>
   </CATALOG>
              ⸺14
```

```
          52
          ↓
       56  62 68
       54 58 64  46
1,B,S,[],0,1,ND>MetaData>,
1,N,I,[],0,4,ND>MetaData>http://neocore.com/docMetaData:TimeStamp>,
1,N,E,[],0,4,ND>MetaData>http://neocore.com/docMetaData:DocID>,c:\testxml\testdoe.xml
1,N,E,[],0,4,ND>MetaData>http://neocore.com/docMetaData:SchemaName>,schema
3,N,E,[],0,4,ND>MetaData>http://neocore.com/docMetaData:InstructFileName>,ifile
42  1,N,E,[],0,2,ND>MyHeader>,Header 47
44  1,N,E,[],0,2,ND>CATALOG>CD>TITLE>,Empire Burlesque  16
66  1,N,E,[],5,4,ND>CATALOG>CD>ARTIST>Bob Dylan 48
    1,N,E,[],5,4,ND>CATALOG>CD>COUNTRY>,USA      50
    1,N,E,[],5,4,ND>CATALOG>CD>COMPANY>,Columbia
    1,N,E,[],5,4,ND>CATALOG>CD>PRICE>,10.90
    1,N,E,[],5,4,ND>CATALOG>CD>YEAR>,1985
60  2,N,E,[],5,4,ND>CATALOG>CD>TITLE>,Hide your heart
    1,N,E,[],5,3,ND>CATALOG>CD>ARTIST>,Bonnie Tylor
    1,N,E,[],11,4,ND>CATALOG>CD>COUNTRY>,UK
    1,N,E,[],11,4,ND>CATALOG>CD>COMPANY>,CBS Records
    1,N,E,[],11,4,ND>CATALOG>CD>PRICE>,9.90
    1,N,E,[],11,4,ND>CATALOG>CD>YEAR>,1988
    2,N,E,[],11,4,ND>CATALOG>CD>TITLE>,Greatest Hits
    1,N,E,[],5,3,ND>CATALOG>CD>ARTIST>Dolly Parton
    1,N,E,[],17,4,ND>CATALOG>CD>COUNTRY>,USA
    1,N,E,[],17,4,ND>CATALOG>CD>COMPANY>,RCA
    1,N,E,[],17,4,ND>CATALOG>CD>PRICE>,9.90
    1,N,E,[],17,4,ND>CATALOG>CD>YEAR>,1982
    2,N,E,[],17,4,ND>CATALOG>CD>TITLE>,Still got the blues
    1,N,E,[],5,3,ND>CATALOG>CD>ARTIST>,Gary More
    1,N,E,[],23,4,ND>CATALOG>CD>COUNTRY>,UK
    1,N,E,[],23,4,ND>CATALOG>CD>COMPANY>,Virgin Records
    1,N,E,[],23,4,ND>CATALOG>CD>PRICE>,10.20
    1,N,E,[],23,4,ND>CATALOG>CD>YEAR>,1990
    2,N,E,[],23,4,ND>CATALOG>CD>
```

220

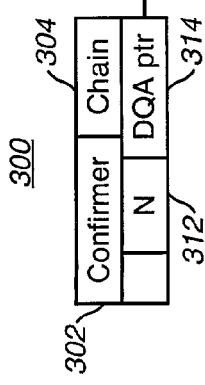
FIG. 12
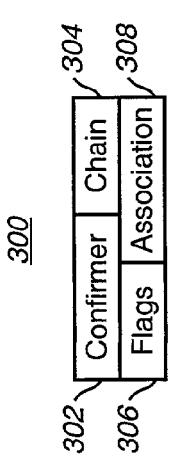
FIG. 13
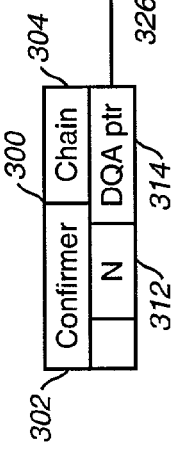
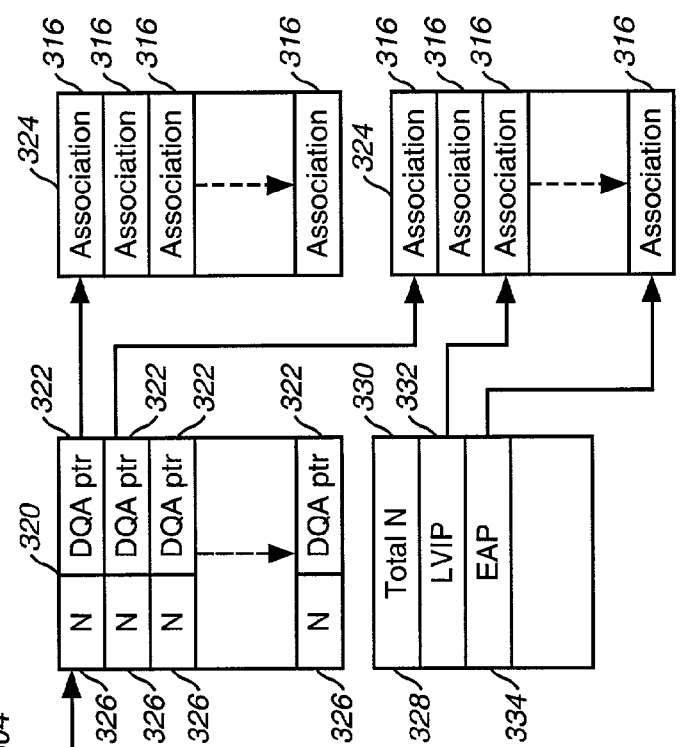
FIG. 14

METHOD OF OPERATING A HIERARCHICAL DATA DOCUMENT SYSTEM HAVING A DUPLICATE TREE STRUCTURE

RELATED APPLICATIONS

This patent application claims priority from the provisional patent application entitled, "Duplicate Tree Structures in DPP Virtual Associative Memories", Filed Oct. 13, 2000, having Ser. No. 60/240,574

This patent application is related to the U.S. patent application, Ser. No. 09/419,217, entitled "Memory Management System and Method" filed on Oct. 15, 1999, assigned to the same assignee as the present application and the U.S. patent application, Ser. No. 09/768,102 (NEO-0002), entitled "Method of Storing a Structured Data Document" filed on Jan. 23, 2001, assigned to the same assignee as the present application and the U.S. patent application, Ser. No. 09/767,797(NEO-0003), entitled "Method and System for Storing a Flatten Structured Data Document" filed on Jan. 23, 2001, assigned to the same assignee as the present application.

FIELD OF THE INVENTION

The present invention relates generally to the field of structured data documents and more particularly to a method of operating a hierarchical data document system having a duplicate tree structure

BACKGROUND OF THE INVENTION

Structured data documents such as HTML (Hyper Text Markup Language), XML (extensible Markup Language) and SGML (Standard Generalized Markup Language) documents and derivatives use tags to describe the data associated with the tags. This has an advantage over databases in that not all the fields are required to be predefined. XML is presently finding widespread interest for exchanging information between businesses. XML appears to provide an excellent solution for internet business to business applications. Unfortunately, XML documents require a lot of memory and bandwidth to store and transmit efficiently.

Thus there exists a need for a method of operating a hierarchical data document system having a duplicate tree structure that reduces the memory and bandwidth requirements associated with using these documents.

BRIEF DESCRIPTION OF THE DRAWINGS

FIG. 1 is an example of an XML document in accordance with one embodiment of the invention;

FIG. 2 is an example of a flattened data document in accordance with one embodiment of the invention;

FIG. 12 is a schematic diagram of a location of a map index in accordance with one embodiment of the invention;

FIG. 13 is a schematic diagram of a map index and a duplicate array in accordance with one embodiment of the invention;

FIG. 14 is a schematic diagram of a map index and a second level duplicate tree structure in accordance with one embodiment of the invention;

DETAILED DESCRIPTION OF THE DRAWINGS

Figure 3:
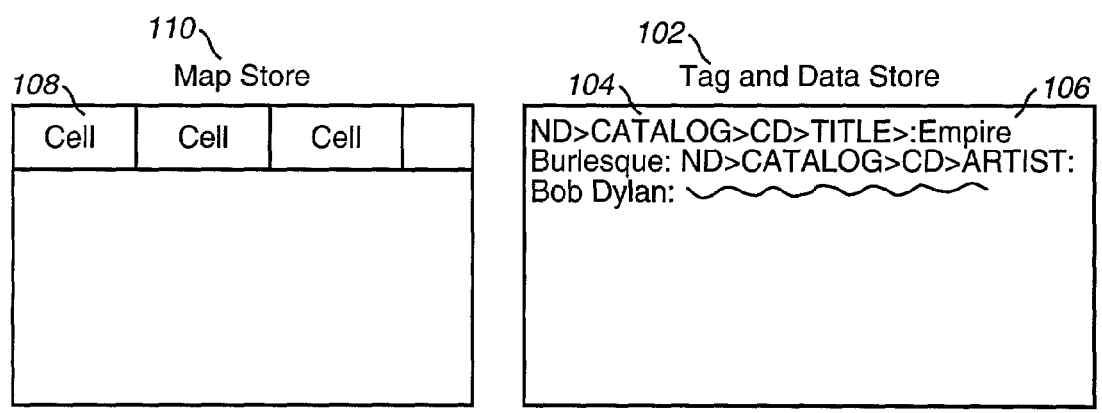
FIG. 3 is a block diagram of a system for storing a flattened data document in accordance with one embodiment of the invention.

A hierarchical structured data document system having a duplicated tree structure includes a map store. A map index has a map pointer pointing to a location in the map store in one of the map index's locations. A duplicate array contains a second map pointer. The map index has an array pointer that points to the duplicate array. The duplicate array stores map pointer pointing to duplicates of tags or data stored in the map store. This system of handling duplicates reduces the size of a structured data document and increases the ease of storing the document.

FIG. 1 is an example of an XML document 10 in accordance with one embodiment of the invention. The words between the < > are tags that describe the data. This document is a catalog 12. Note that all tags are opened and later closed. For instance <catalog> 12 is closed at the end of the document </catalog> 14. The first data item is "Empire Burlesque" 16. The tags <CD> 18 and <TITLE> 20 tell us that this is the title of the CD (Compact Disk). The next data entry is "Bob Dylan" 22, who is the artist. Other compact disks are described in the document.

FIG. 2 is an example of a flattened data document 40 in accordance with one embodiment of the invention. The first five lines 42 are used to store parameters about the document. The next line 44 shows a line that has flattened all the tags relating to the first data entry 16 of the XML document 10. Note that the tag <ND> 46 is added before every line but is not required by the invention. The next tag is CATALOG>

47 which is the same as in the XML document 10. Then the tag CD> 48 is shown and finally the tag TITLE> 50. Note this is the same order as the tags in the XML document 10. A plurality of formatting characters 52 are shown to the right of each line. The first column is the n-tag level 54. The n-tag defines the number of tags that closed in that line. Note that first line 44, which ends with the data entry "Empire Burlesque" 16, has a tag 24 (FIG. 1) that closes the tag TITLE. The next tag 26 opens the tag ARTIST. As a result the n-tag for line 44 is a one. Note that line 60 has an n-tag of two. This line corresponds to the data entry 1985 and both the YEAR and the CD tags are closed.

The next column 56 has a format character that defines whether the line is first (F) or another line follows it (N-next) or the line is the last (L). The next column contains a line type definition 58. Some of the line types are: time stamp (S); normal (E); identification (I); attribute (A); and processing (P). The next column 62 is a delete level and is enclosed in a parenthesis. When a delete command is received the data is not actually erased but is eliminated by entering a number in the parameters in a line to be erased. So for instance if a delete command is received for "Empire Burlesque" 16, a "1" would be entered into the parenthesis of line 44. If a delete command was received for "Empire Burlesque" 16 and <TITLE>, </TITLE>, a "2" would be entered into the parenthesis. The next column is the parent line 64 of the current line. Thus the parent line for the line 66 is the first line containing the tag CATALOG. If you count the lines you will see that this is line five (5) or the preceding line. The last column of formatting characters is a p-level 68. The p-level 68 is the first new tag opened but not closed. Thus at line 44, which corresponds to the data entry "Empire Burlesque" 16, the first new tag opened is CATALOG. In addition the tag CATALOG is not closed. Thus the p-level is two (2).

FIG. 3 is a block diagram of a system 100 for storing a flattened data document in accordance with one embodiment of the invention. Once the structured data document is flattened as shown in FIG. 2, it can be stored. Each unique tag or unique set of tags for each line is stored to a tag and data store 102. The first entry in the tag and data store is ND>CATALOG>CD>TITLE> 104. Next the data entry "Empire Burlesque" 106 is stored in the tag and data store 102. The pointers to the tag and data entry in the tag and data store 102 are substituted into line 44. Updated line 44 is then stored in a first cell 108 of the map store 110. In one embodiment the tag store and the data store are separate. The tag and data store 102 acts as a dictionary, which reduces the required memory size to store the structured data document. Note that the formatting characters allow the structured data document to be completely reconstructed.

Figure 4:
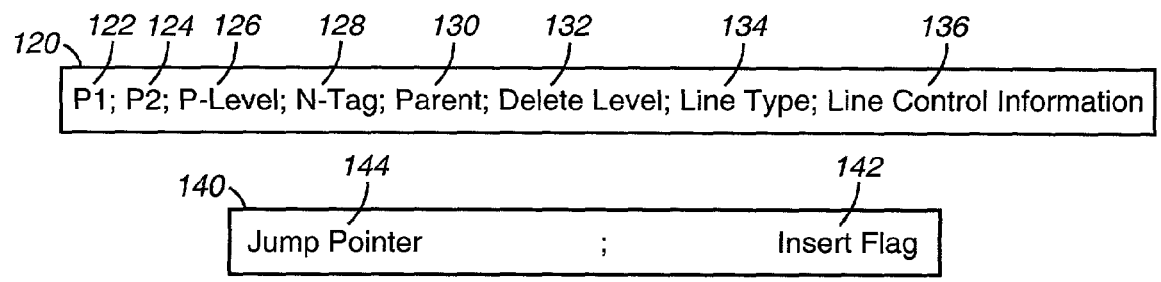
FIG. 4 shows two examples of a map store cell in accordance with one embodiment of the invention.

FIG. 4 shows two examples of a map store cell in accordance with one embodiment of the invention. The first example 120 works as described above. The cell 120 has a first pointer ($P_1$) 122 that points to the tag in the tag and data store 102 and a second pointer ($P_2$) 124 that points to the data entry. The other information is the same as in a flattened line such as: p-level 126; n-tag 128; parent 130; delete level 132; line type 134; and line control information 136. The second cell type 140 is for an insert. When an insert command is received a cell has to be moved. The moved cell is replaced with the insert cell 140. The insert cell has an insert flag 142 and a jump pointer 144. The moved cell and the inserted cell are at the jump pointer.

Figure 5:
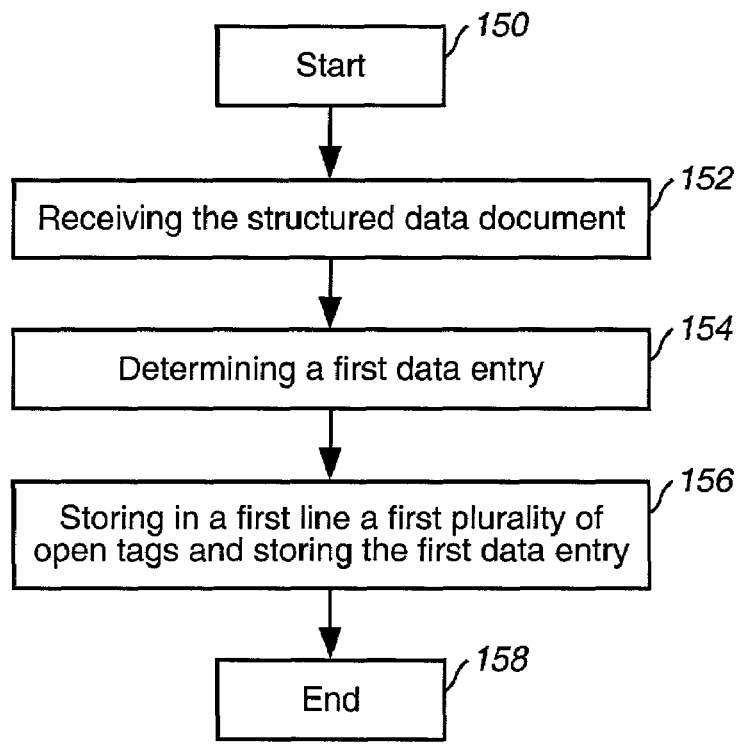
FIG. 5 is a flow chart of a method of storing a structured data document in accordance with one embodiment of the invention.

FIG. 5 is a flow chart of a method of storing a structured data document. The process starts, step 150, by receiving the structured data document at step 152. A first data entry is determined at step 154. In one embodiment, the first data entry is an empty data slot. At step 156 a first plurality of open tags and the first data entry is stored which ends the process at step 158. In one embodiment a level of a first opened tag is determined. The level of the first opened tag is stored. In another embodiment, a number of consecutive tags closed after the first data entry is determined. This number is then stored. A line number is stored.

In one embodiment, a next data entry is determined. A next plurality of open tags proceeding the next data entry is stored. These steps are repeated until a next data entry is not found. Note that the first data entry may be a null. A plurality of format characters associated with the next data entry are also stored. In one embodiment the flattened data document is expanded into the structured data document using the plurality of formatting characters.

Figure 6:
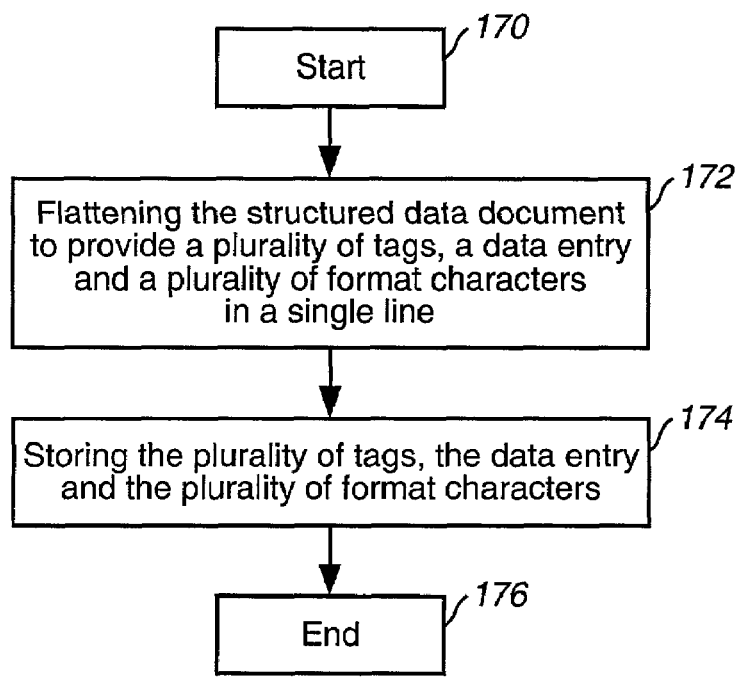
FIG. 6 is a flow chart of a method of storing a structured data document in accordance with one embodiment of the invention.

FIG. 6 is a flow chart of a method of storing a structured data document. The process starts, step 170, by flattening the structured data document to a provide a plurality of tags, a data entry and a plurality of format characters in a single line at step 172. At step 174 the plurality of tags, the data entry and the plurality of format characters are stored which ends the process at step 176. In one embodiment, the plurality of tags are stored in a tag and data store. In addition, the plurality of format characters are stored in map store. The data entry is stored in the tag and data store. A first pointer in the map store points to the plurality of tags in the tag and data store. A second pointer is stored in the map store that points to the data store. In one embodiment, the structured data document is received. A first data entry is determined. A first plurality of open tags proceeding the first data entry and the first data entry are placed in a first line. A next data entry is determined. A next plurality of open tags proceeding the next data entry is placed in the next line. These steps are repeated until a next data entry is not found. In one embodiment a format character is placed in the first line. In one embodiment the format character is a number that indicates a level of a first tag that was opened. In one embodiment the format character is a number that indicates a number of tags that are consecutively closed after the first data entry. In one embodiment the format character is a number that indicates a line number of a parent of a lowest level tag. In one embodiment the format character is a number that indicates a level of a first tag that was opened but not closed. In one embodiment the format character is a character that indicates a line type. In one embodiment the format character indicates a line control information. In one embodiment the structured data document is an extensible markup language document. In one embodiment the next data entry is placed in the next line.

Figure 7:
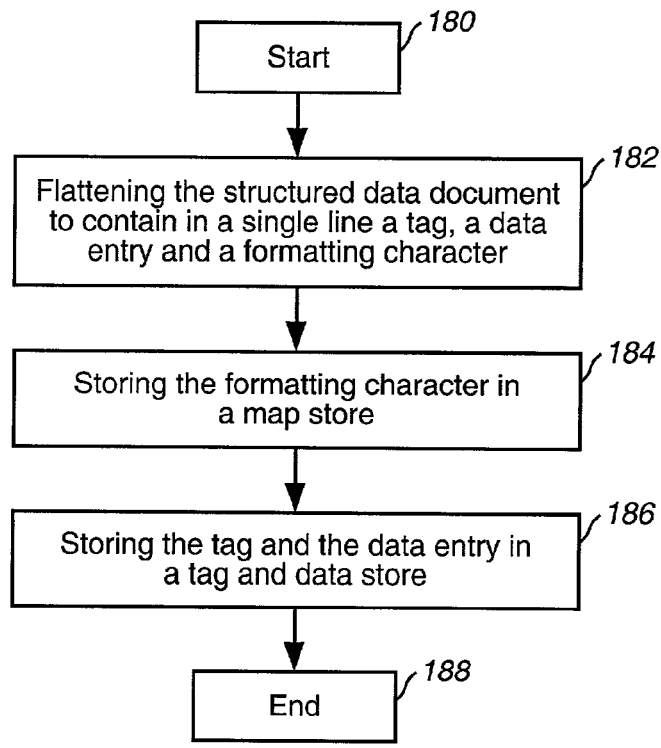
FIG. 7 is a flow chart of a method of storing a structured data document in accordance with one embodiment of the invention.

FIG. 7 is a flow chart of a method of storing a structured data document. The process starts, step 180, by flattening the structured data document to contain in a single line a tag, a data entry and a formatting character at step 182. The formatting character is stored in a map store at step 184. At step 186 the tag and the data entry are stored in a tag and data store which ends the process at step 188. In one embodiment a first pointer is stored in the map store that points to the tag in the tag and data store. A second pointer is stored in the map store that points to the data entry in the tag and data store. In one embodiment a cell is created in the map store for each of the plurality of lines in a flattened document. A request is received to delete one of the plurality of data entries. The cell associated with the one of the plurality of data entries is determined. A delete flag is set. Later a restore command is received. The delete flag is unset. In one embodiment, a request to delete one of a plurality of data entries and a plurality of related tags is received. A delete flag is set equal to the number of the plurality of related tags plus one. In one embodiment, a request is received to insert a new entry. A previous cell containing a proceeding data entry is found. The new entry is stored at an end of the map store. A contents of the next cell is moved after the new entry. An insert flag and a pointer to the new entry is stored in the next cell. A second insert flag and second pointer is stored after the contents of the next cell.

Thus there has been described a method of flattening a structured data document. The process of flattening the structured data document generally reduces the number lines used to describe the document. The flattened document is then stored using a dictionary to reduce the memory required to store repeats of tags and data. In addition, the dictionary (tag and data store) allows each cell in the map store to be a fixed length. The result is a compressed document that requires less memory to store and less bandwidth to transmit.

Figure 8:
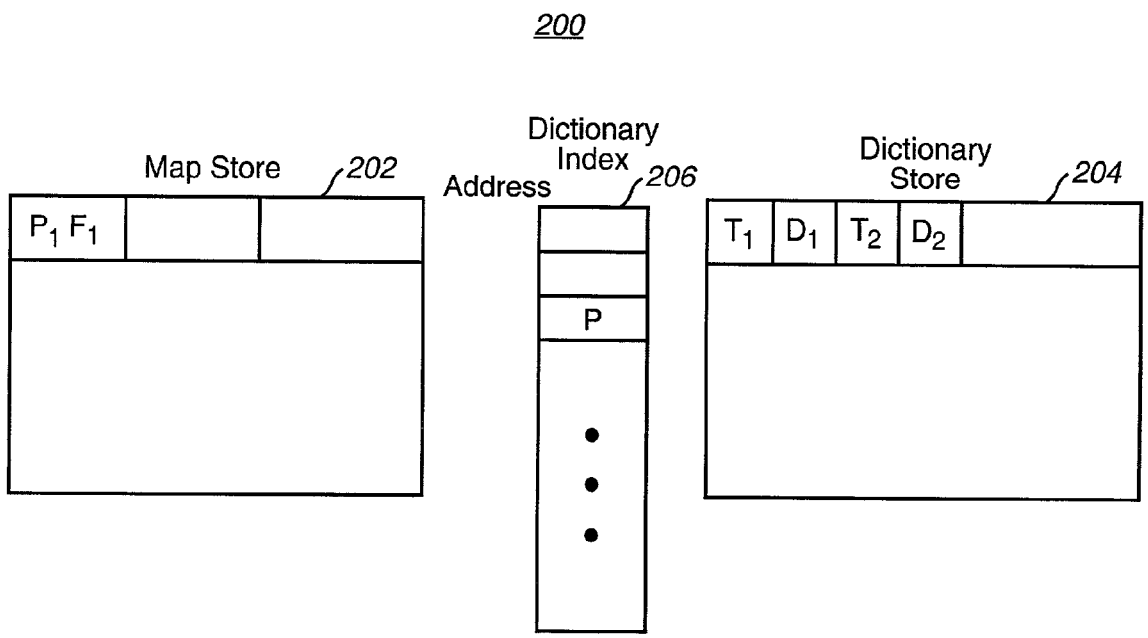
FIG. 8 is a block diagram of a system for storing a flattened structured data document in accordance with one embodiment of the invention.

FIG. 8 is a block diagram of a system 200 for storing a flattened structured data document in accordance with one embodiment of the invention. The system 200 has a map store 202, a dictionary store 204 and a dictionary index 206. Note that this structure is similar to the system of FIG. 3. The dictionary store 204 has essentially the same function as the map and tag store (FIG. 3) 102. The difference is that a dictionary index 206 has been added. The dictionary index 206 is an associative index. An associative index transforms the item to be stored, such as a tag, tags or data entry, into an address. Note that in one embodiment the transform returns an address and a confirmer as explained in the U.S. patent application, Ser. No. 09/419,217, entitled "Memory Management System and Method" filed on Oct. 15, 1999, assigned to the same assignee as the present application and hereby incorporated by reference. The advantage of the dictionary index 206 is that when a tag or data entry is received for storage it can be easily determined if the tag or data entry is already stored in the dictionary store 204. If the tag or data entry is already in the dictionary store the offset in the dictionary can be immediately determined and returned for use as a pointer in the map store 202.

Figure 9:
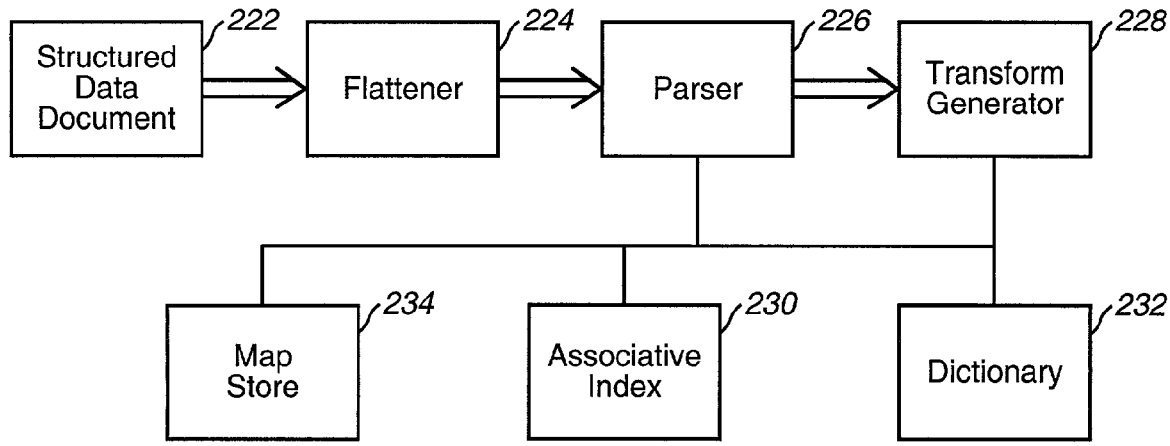
FIG. 9 is a block diagram of a system for storing a flattened structured data document in accordance with one embodiment of the invention.

FIG. 9 is a block diagram of a system 220 for storing a flattened structured data document in accordance with one embodiment of the invention. A structured data document 222 is first processed by a flattener 224. The flattener 224 performs the functions described with respect to FIGS. 1 & 2. A parser 226 then determines the data entries and the associated tags. One of the data entries is transformed by the transform generator 228. This is used to determine if the data entry is in the associative index 230. When the data entry is not in the associative index 230, it is stored in the dictionary 232. A pointer to the data in the dictionary is stored at the appropriate address in the associative index 230. The pointer is also stored in a cell of the map store 234 as part of a flattened line.

Figure 10:
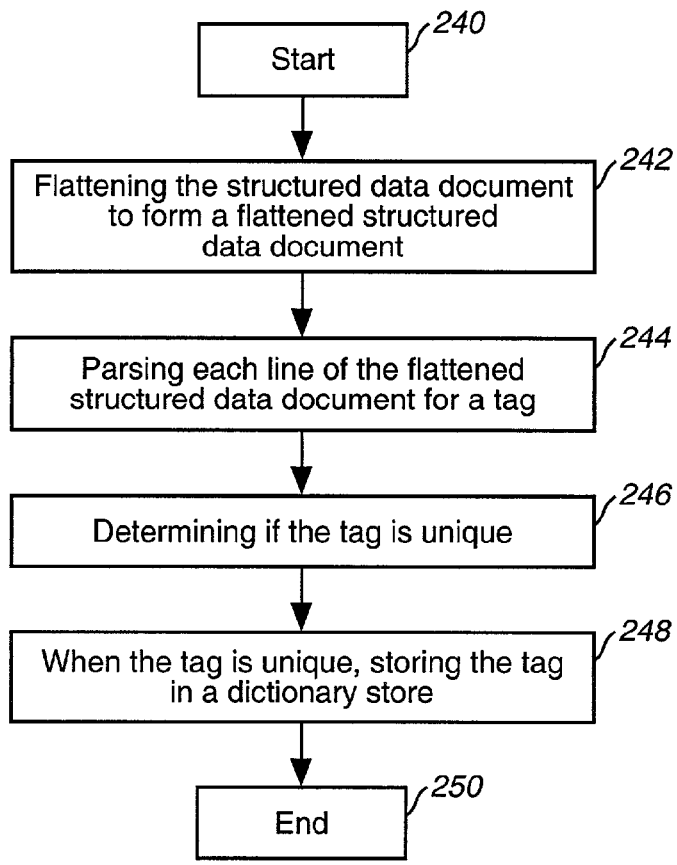
FIG. 10 is a flow chart of the steps used in a method of storing a flattened structured data document in accordance with one embodiment of the invention.

FIG. 10 is a flow chart of the steps used in a method of storing a flattened structured data document in accordance with one embodiment of the invention. The process starts, step 240, by flattening the structured data document to form a flattened structured data document at step 242. Each line of the flattened structured data document is parsed for a tag at step 244. Next it is determined if the tag is unique at step 246. When the tag is unique, step 248, the tag is stored in a dictionary store which ends the process at step 250. In one embodiment a tag dictionary offset is stored in the map store. A plurality of format characters are stored in the map store. When a tag is not unique, a tag dictionary offset is determined. The tag dictionary offset is stored in the map store.

In one embodiment, the tag is transformed to form a tag transform. An associative lookup is performed in a dictionary index using the tag transform. A map index is created that has a map pointer that points to a location in the map store of the tag. The map pointer is stored at an address of the map index that is associated with the tag transform.

Figure 11:
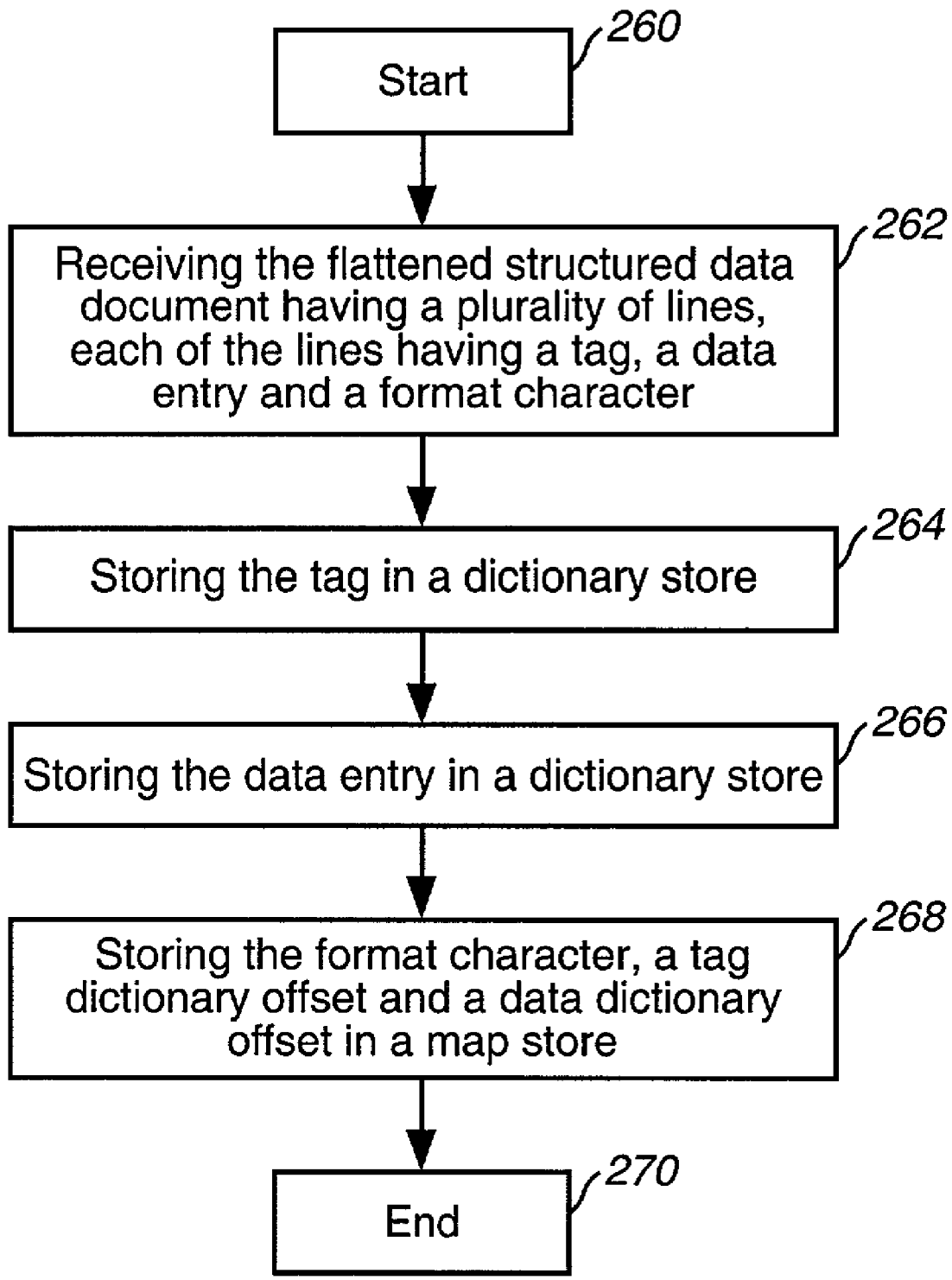
FIG. 11 is a flow chart of the steps used in a method of storing a flattened structured data document in accordance with one embodiment of the invention.

FIG. 11 is a flow chart of the steps used in a method of storing a flattened structured data document in accordance with one embodiment of the invention. The process starts, step 260, by receiving the flattened structured data document that has a plurality of lines at step 262. Each of the plurality of lines contains a tag, a data entry and a format character. The tag is stored in a dictionary store at step 264. The data entry is stored in the dictionary store at step 266. At step 268 the format character, a tag dictionary offset and a data dictionary offset are stored in a map store which ends the process at step 270. In one embodiment, the tag is transformed to form a tag transform. The tag dictionary offset is stored in a dictionary index at an address pointed to by the tag transform. In one embodiment, it is determined if the tag is unique. When the tag is unique, the tag is stored in the dictionary store otherwise the tag is not stored (again) in the dictionary store. To determine if the tag is unique, it is determined if a tag pointer is stored in the dictionary index at an address pointed to by the tag transform.

In one embodiment, the data entry is transformed to form a data transform. The data dictionary offset is stored in the dictionary index at an address pointed to by the data transform. In one embodiment each of the flattened lines has a plurality of tags.

In one embodiment, a map index is created. Next it is determined if the tag is unique. When the tag is unique, a pointer to a map location of the tag is stored in the map index. When the tag is not unique, it is determined if a duplicates flag is set. When the duplicates flag is set, a duplicates count is incremented. When the duplicates flag is not set, the duplicates flag is set. The duplicates count is set to two. In one embodiment a transform of the tag with an instance count is calculated to form a first instance tag transform and a second instance tag transform. A first map pointer is stored in the map index at an address associated with the first instance transform. A second map pointer is stored in the map index at an address associated with the second instance transform.

In one embodiment a transform of the tag with an instances count equal to the duplicates count is calculated to form a next instance tag transform. A next map pointer is stored in the map index at an address associated with the next instance transform.

In one embodiment, a map index is created. Next it is determined if the data entry is unique. When the data entry is unique, a pointer to a map location of the tag is stored.

Thus there has been described an efficient manner of storing a structured data document that requires significantly less memory than conventional techniques. The associative indexes significantly reduces the overhead required by the dictionary.

FIG. 12 is a schematic diagram of a location of a map index 300 in accordance with one embodiment of the invention. The location 300 in the map index contains a confirmer 302 in one embodiment. The confirmer 302 is part of the associative memory scheme explained in the U.S. patent application, Ser. No. 09/419,217, entitled "Memory Management System and Method" filed on Oct. 15, 1999, assigned to the same assignee as the present application and hereby incorporated by reference. The chain 304 is used to store collisions (collisions occur when two items have the same address but are not duplicates and therefor have different confirmers). The chain points to the location where the collision is stored. The flags section 306 contains the primary and allocated flags (see Ser. No. 09/419,217 "Memory Management System and Method" referenced above). The flags also contain an indicator as to whether there is a duplicate tree. The association 308 is a map pointer that points to the location where the item is stored in the map store 234 (see FIG. 10).

FIG. 13 is a schematic diagram of a map index 300 and a duplicate array (first level duplicate array, outer-most level) 310 in accordance with one embodiment of the invention. When an exact duplicate of an item needs to be stored, a duplicate array 310 is created. The location in the map index 300 has a slightly different structure, when a duplicate array is created. The flags section 306 and association 308 are converted to an N section 312 and a duplicate array pointer 314. The N section 312 contains the primary and allocated flags and the number of levels in the duplicate tree. The duplicate array pointer 314 points to the duplicate array 310. The duplicate array 310 contains the map pointers 316. Note that the duplicate array 310 may not be full of map pointers (associations) 316.

FIG. 14 is a schematic diagram of a map index and a second level duplicate tree structure in accordance with one embodiment of the invention. The structure of the map index 300 is the same as in FIG. 13 except that the pointer 314 points to a pointer array 320. The pointer array 320 contains array pointers (first array pointer, second array pointer) 322 that point to second level arrays (a second level duplicate array, outer-most level) 324. The second level arrays 324 contain associations (map pointer) 316. Each location (filled) contains an N section 326. The N section 326 indicates the number of duplicates stored in the associated second level array 324. In one embodiment, an information array 328 is also created for a second level duplicate tree structure. The information array 328 may contain the total number 330 of associations (map pointers) in all of the second level arrays 324. A last valid entry pointer 332 points to the last association stored in any of the second level arrays 324. The associations 316 may not be stored in every location of the second level arrays. This is because of the way inserts and deletes are handled. An end of arrays pointer 334 points to the end of the second level arrays. Note that the second level arrays 324 are created one at a time as they are needed. Note, each of the arrays 320, 324 are of a fixed sized (e.g., 16 locations, addresses and x bytes).

Figure 15:
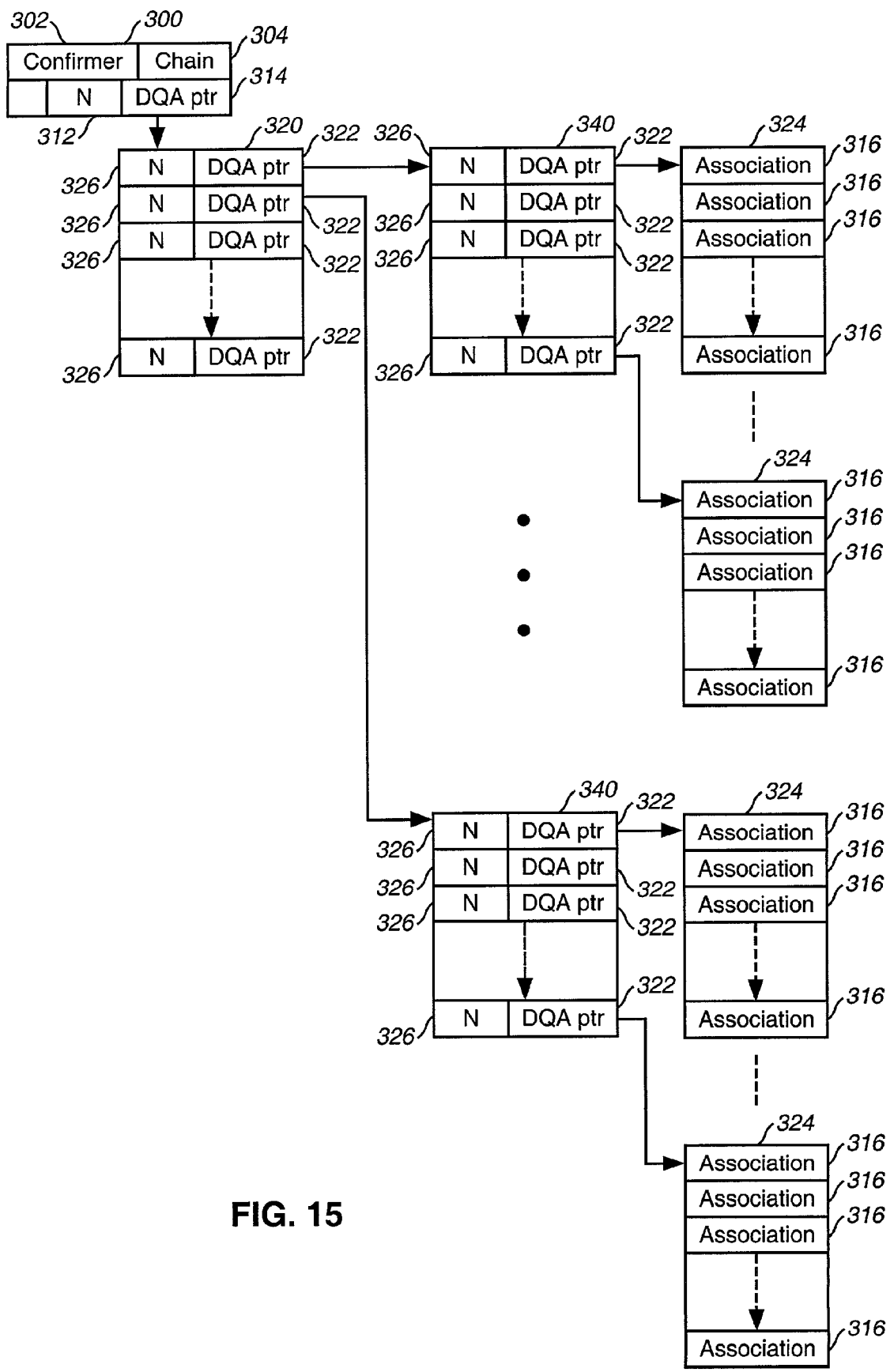
FIG. 15 is a schematic diagram of a map index and a third level duplicate tree structure in accordance with one embodiment of the invention.

FIG. 15 is a schematic diagram of a map index and a third level duplicate tree structure in accordance with one embodiment of the invention. This example is similar to FIG. 14 except a second level of pointer arrays 340 have been added. As will be apparent to those skilled in the art the number of duplicate tree levels can be expanded to fit as many duplicates as are required to be stored. Note that in one embodiment, the associations are stored in numerical order. As a result a hole must be opened up in the association list when inserting an association in the middle of an array. Instead of shifting long lists of associations, new empty arrays may be added to make room for new associations. When a new association is added in the middle of an array, the duplicate array is checked to determine if an empty location exists in the array. If the current array is full, the array above and array below (adjacent arrays) are checked to determine if they are full. If one of these arrays has an empty location the associations are shifted to make room for the new association. When both of the adjacent arrays are also full, it is determined if a new array may be added. When a new array may be added, a new array is created and inserted into the duplicate arrays. The associations are then shifted into the new array to make room for the new association. This approach will leave holes in the duplicate tree structure, however this method prevents the entire list of duplicates from having to shifted every time a duplicate is inserted or removed from the middle of the list.

Figure 16:
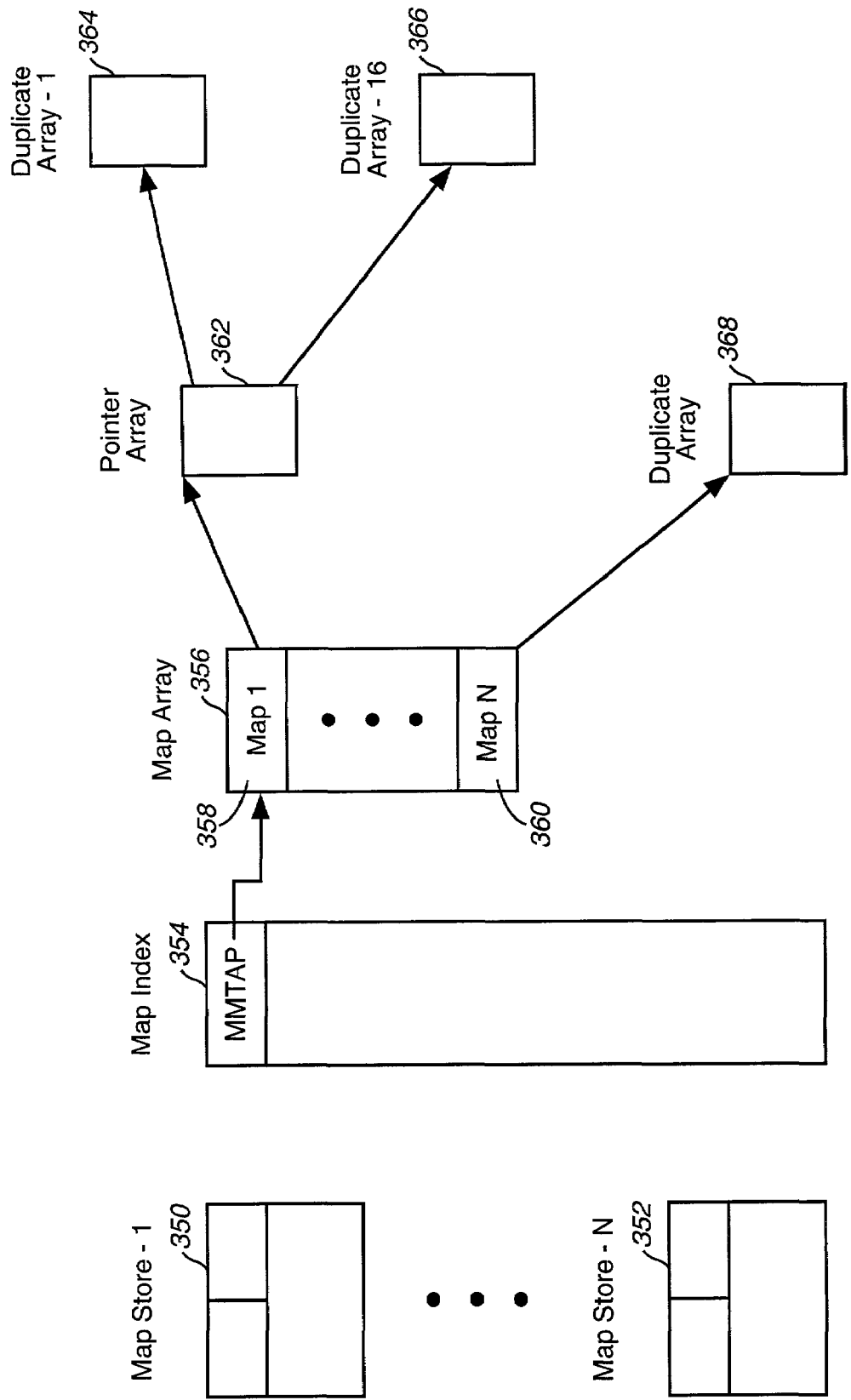
FIG. 16 is a schematic diagram of a hierarchical structured data document system having a duplicate tree structure in accordance with one embodiment of the invention.

FIG. 16 is a schematic diagram of a hierarchical structured data document system having a duplicate tree structure in accordance with one embodiment of the invention. In this figure multiple map stores 350, 352 are indexed by a single map index 354. When a duplicate occurs, the first array created is a map array (multiple map tree array) 356. Thus there will be a map array for every duplicate location in the map index 354. Each map array includes a plurality of pointers 358, 360. The first pointer 358 points to the duplicate tree structure for the first map store 350. In the example the first pointer 358 points to a pointer array 362. The pointer array 362 has a plurality of duplicate pointers that point to a plurality of duplicate arrays 364, 366. Another pointer 360 in the map array 356 points to a first level duplicate tree structure having a single duplicate array 368. A multiple map tree pointer 370 points to the map array 356.

Figure 17:
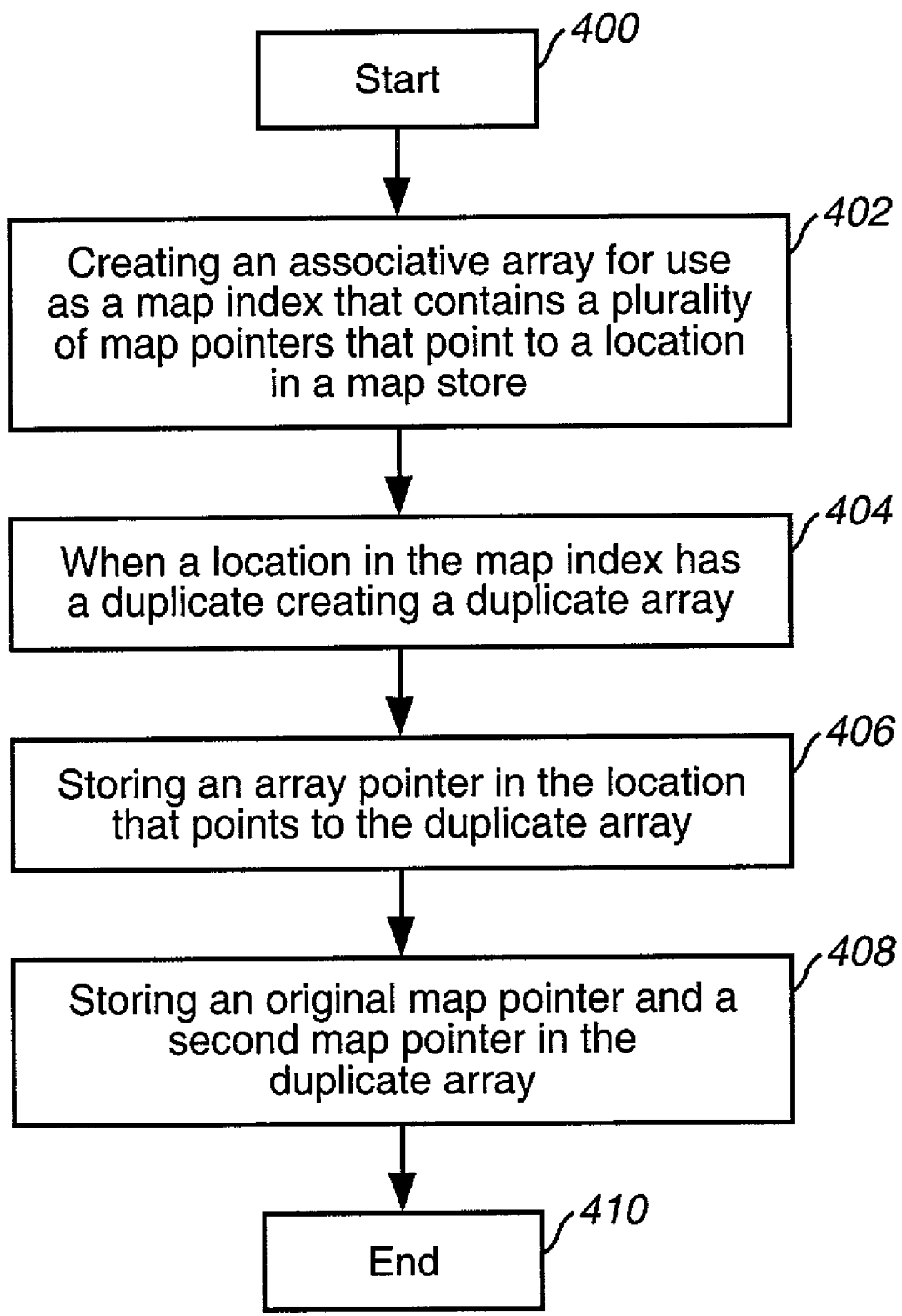
FIG. 17 is a flow chart of the steps used in a method of operating a hierarchical structured data document system having a duplicate tree structure in accordance with one embodiment of the invention.

FIG. 17 is a flow chart of the steps used in a method of operating a hierarchical structured data document system having a duplicate tree structure in accordance with one embodiment of the invention. The process starts, step 400, by creating an associative array for use as a map index that contains a plurality of map pointers that point to a location in a map store at step 402. When a location in the map index has a duplicate, a duplicate array is created at step 404. An array pointer is stored in the location that points to the duplicate array at step 406. At step 408 an original map pointer and a second map pointer is stored in the duplicate array which ends the process at step 410. In one embodiment, an indicator of the number of duplicates is stored in the location of the map index. When the location in the map index has a plurality of duplicates, it is determined if the plurality of duplicates is greater than a first predetermined number and less than a second predetermined number. When the plurality of duplicates is greater than a first predetermined number and less than a second predetermined number, creating a pointer array and at least two duplicate arrays. At least two pointers are stored in the pointer array that point to the at least two duplicate arrays.

In one embodiment, a multiple map tree array is created. An array pointer that points to the pointer array is stored in a location of the multiple map tree array. Next a multiple map tree array pointer 370 (See FIG. 16) is stored in the location in the map index.

Figure 18:
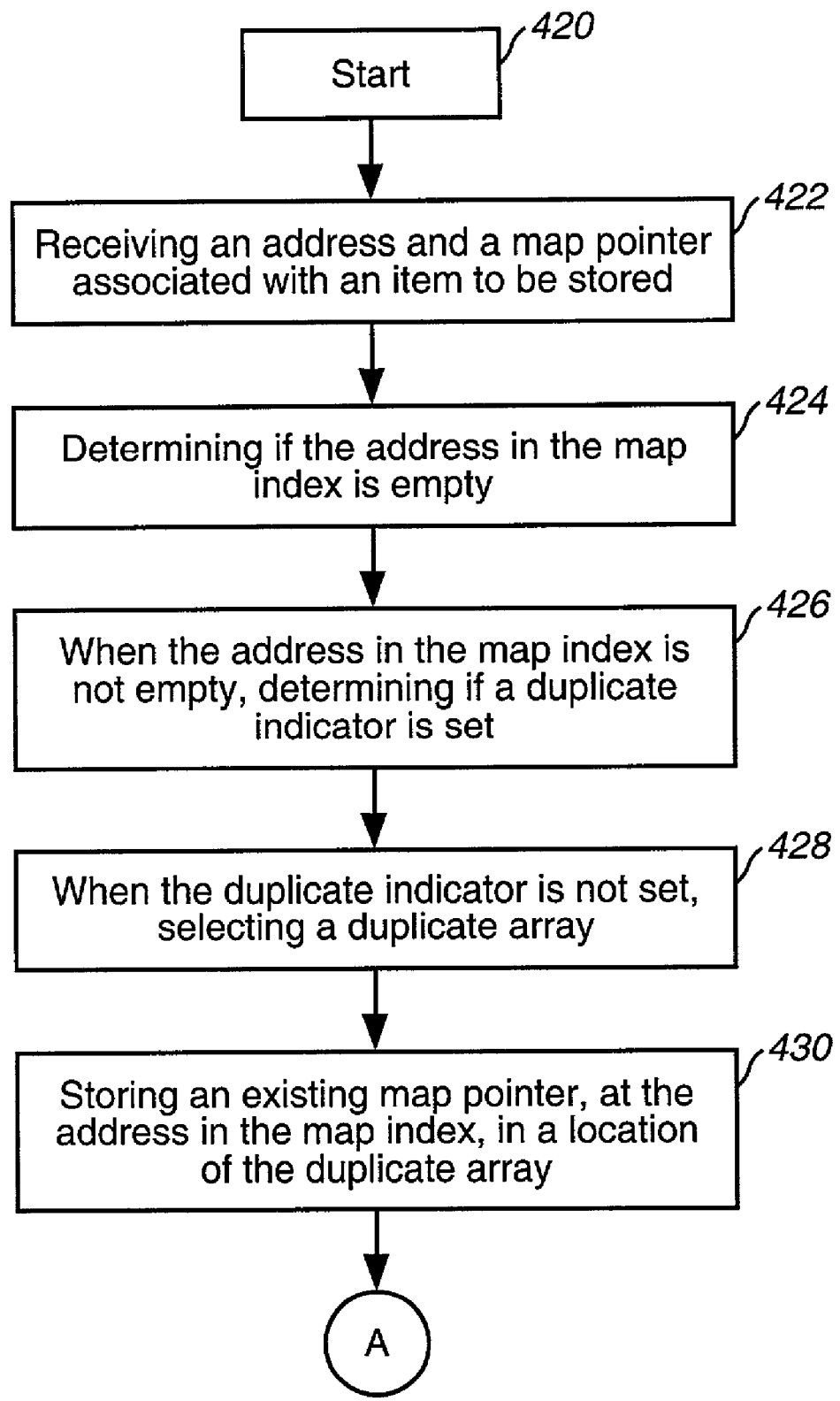
FIGS. 18 & 19 are a flow chart of the steps used in a method of operating a hierarchical structured data document system having a duplicate tree structure in accordance with one embodiment of the invention.
Figure 19:
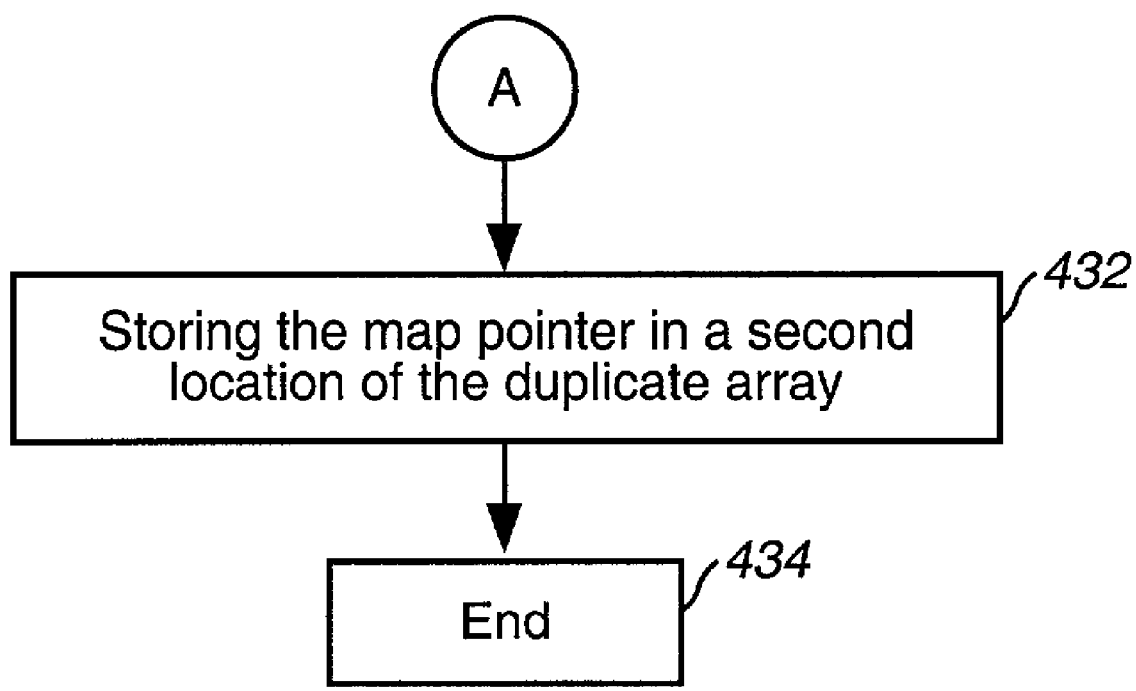

FIGS. 18 & 19 are a flow chart of the steps used in a method of operating a hierarchical structured data document system having a duplicate tree structure in accordance with one embodiment of the invention. The process starts, step 420, by receiving an address and a map pointer associated with an item to be stored at step 422. Next, it is determined if the address in the map index is empty at step 424. When the address in the map index is not empty, it is determined if a duplicate indicator is set at step 426. When the duplicate indicator is not set, a duplicate array is selected at step 428. An existing map pointer, at the address in the map index, is stored in a location of the duplicate array at step 430. At step 432 the map pointer is stored in a second location of the duplicate array which ends the process at step 434. In one embodiment, the duplicate indicator is set to a first level. A pointer to the duplicate array is stored. In one embodiment, a multiple map tree array is created. A tree pointer is stored in a location of the multiple map tree array.

In one embodiment, when the duplicate indicator is set, a level of the duplicate indicator is determined. When the level of the duplicate indicator is a first level, it is determined if a first level duplicate array is full. When the first level duplicate array is not full, the map pointer is stored in the first level duplicate array. When the first level duplicate array is full, a pointer array is created having a location containing a first array pointer. The first level duplicate array is moved to a second level duplicate array and pointed to by the first array pointer. Next a second-second level duplicate array is created. A map pointer is stored in a location of the second-second level duplicate array. A second array pointer is stored in a second location of the pointer array. The level of the duplicate indicator is updated to two. In one embodiment, an information array is created. A number of pointers in a second level arrays is stored in the information array. A last valid item pointer is stored in the information array. An end of arrays pointer is stored in the information array.

In one embodiment, when the duplicate indicator is set, a level of the duplicate indicator is determined. When the level of the duplicate indicator is a second level or greater, determining if the map pointer needs to be inserted into a full array at an outer-most level. When the map pointer needs to be inserted into a full array, determining if the outer-most level has a full complement of arrays. When the outer-most level does not have a full complement of arrays, creating a new outer-most array. A portion of the full array is moved into the new outer-most array. In one embodiment, the new outermost array is only created when an adjacent arrays are full.

Thus there has been described an efficient method of handling duplicates in an associative memory system. The system and method significantly reduce the collisions that result from storing duplicates inside of the associative memory.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of using duplicate tree structures for a hierarchical structure data document, comprising the steps of:
    a) receiving an address and a map pointer associated with an item to be stored;
    b) determining if the address in a map index is empty;
    c) when the address in the map index is not empty, determining if a duplicate indicator is set;
    d) when the duplicate indicator is not set, selecting a duplicate array;
    e) storing an existing map pointer, at the address in the map index, in a location of the duplicate array; and
    f) storing the map pointer in a second location of the duplicate array.

2. The method of claim 1, further including the steps of:
    g) setting the duplicate indicator to a first level;
    h) storing a pointer to the duplicate array.

3. The method of claim 1, wherein the step of (e) further includes the step of:
    e1) creating a multiple map tree array;
    e2) storing a tree pointer in a location of the multiple map tree array.

4. The method of claim 1, further including the steps of:
    g) when the duplicate indicator is set, determining a level of the duplicate indicator;
    h) when the level of the duplicate indicator is a first level, determining if a first level duplicate array is full;
    i) when the first level duplicate array is not full, storing the map pointer in the first level duplicate array.

5. The method of claim 4, further including the steps of:
    j) when the first level duplicate array is full, creating a pointer array having a location containing a first array pointer;
    k) moving the first level duplicate array to a second level duplicate array pointed to by the first array pointer.

6. The method of claim 5, further including the steps of:
    l) creating a second-second level duplicate array;
    m) storing the map pointer in a location of the second-second duplicate level array.

7. The method of claim 6, further including the step of:
    n) storing a second array pointer in a second location of the pointer array.

8. The method of claim 7, further including the step of:
    o) updating the level of the duplicate indicator to two.

9. The method of claim 7, further including the steps of:
    o) creating an information array;
    p) storing a number of pointers located in a second level arrays.

10. The method of claim 9, further including the steps of:
    q) storing a last valid item pointer in the information array;
    r) storing an end of arrays pointer in the information array.

11. The method of claim 1, further including the steps of:
    g) when the duplicate indicator is set, determining a level of the duplicate indicator;
    h) when the level of the duplicate indicator is a second level or greater, determining if the map pointer needs to be inserted into a full array at an outer-most level;
    i) when the map pointer needs to be inserted into the full array, determining if the outer-most level has a full complement of arrays;
    j) when the outer-most level does not have a full complement of arrays, creating a new outer-most level array.

12. The method of claim 11, further including the steps of:
    k) moving a portion of the full array into the new outer-most array.

13. The method of claim 11, wherein step (h) further includes the step of:
    h1) determining if an adjacent arrays are full;
    h2) when the adjacent arrays are full proceeding to step (i).

14. A hierarchical structured data document system having a duplicate tree structure, comprising:
    a map store;
    a map index having a plurality of locations, at least one of the plurality of locations containing a map pointer pointing to a location in the map store; and
    a duplicate array containing a second map pointer.

15. The system of claim 14, further including a plurality of map stores.

16. The system of claim 15, further including a multiple map tree array having a plurality of locations, each of the locations representing one of the plurality of map stores and one of the locations including a pointer to the duplicate array.

17. The system of claim 16, wherein the map index has a duplicate indicator in one of the plurality of locations and a multiple map pointer pointing to a location in the multiple map tree array.

18. The system of claim 14, further including a plurality of duplicate arrays.

19. The system of claim 18, wherein one of the plurality of duplicate array is a pointer array that contains a pointer to a second of the plurality of duplicate arrays.

20. The system of claim 19, wherein the map index is an associative index.

21. The system of claim 14, wherein the map index contains an indicator of the number of duplicates stored in the duplicate array.

22. The system of claim 14, wherein the duplicate array contains a plurality of map pointers and the plurality of map pointers are stored in numerical order.

23. The system of claim 14, wherein the duplicate array has a predetermined number of locations.

24. A method of operating a hierarchical structured data document system having a duplicate tree structure, comprising the steps of:
   a) creating an associative array for use as a map index that contains a plurality of map pointers that point to a location in a map store;
   b) when a location in the map index has a duplicate creating a duplicate array;
   c) storing an array pointer in the location that points to the duplicate array; and
   d) storing an original map pointer and a second map pointer in the duplicate array.

25. The method of claim 24, further including the step of:
   e) storing an indicator of the number duplicates in the location of the map index.

26. The method of claim 24, further including the steps of:
   e) when the location in the map index has a plurality of duplicates, determining if the plurality of duplicates is greater than a first predetermined number and less than a second predetermined number;
   f) when the plurality of duplicates is greater than a first predetermined number and less than a second predetermined number, creating a pointer array and at least two duplicate arrays;
   g) storing at least two pointers in the pointer array that point to the at least two duplicate arrays.

27. The method of claim 26, wherein step (f) further includes the steps of:
   f1) creating a multiple map tree array;
   f2) storing an array pointer, that points to the pointer array, in a location of the multiple map tree array;
   f3) storing a multiple map tree array pointer in the location in the map index.

* * * * *